United States Patent Office 2,838,567
Patented June 10, 1958

2,838,567
POLYCHLORO-1-(4-CYCLOHEXYLCYCLOHEXYL-AMINO) ALKANOLS

Harry F. Brust, Midland, Mich., assignor to The Dow Chemical Company, Midland, Mich., a corporation of Delaware No Drawing. Application May 6, 1957
Serial No. 657,044

3 Claims. (Cl. 260—563)

The present invention relates to polychloro-1-(4-cyclohexylcyclohexylamino)alkanols having the formula

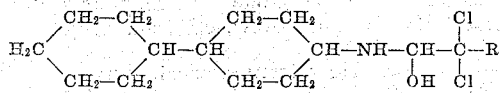

In this and succeeding formulae, R represents hydrogen, chlorine chloromethyl, methyl, ethyl or propyl. These compounds are crystalline solids somewhat soluble in many organic solvents and substantially insoluble in water. They have been found to be useful as parasiticides and are adapted to be employed as active toxic constituents in dust and liquid compositions for the control of the growth of many bacterial and fungal organisms such as *Alternaria solani*. The compounds are also useful as herbicides for the control of the growth of seeds.

The new compounds may be prepared by causing (bicyclohexyl)-4-amine to react portionwise with a polychloroaldehyde having the formula

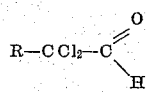

The reaction is carried out in the presence of an inert organic solvent such as ethanol, methanol or ether. Good results are obtained when employing substantially equimolecular proportions of the reactants. The reaction is somewhat exothermic and takes place smoothly at the temperature range of from about −10° to about 70° C. with the formation of the desired product. The temperature may be controlled by regulating the rate of contacting the reactants as well as by external cooling. Upon completion of the reaction, the desired product is separated in conventional fashion.

In carrying out the reaction, the (bicyclohexyl)-4-amine is contacted portionwise with the polychloroaldehyde in the reaction solvent and in the contacting temperature range. During the reaction, the desired product oftentimes precipitates in the reaction mixture as a crystalline solid. Upon completion of the reaction, the reaction mixture may be cooled to precipitate the desired product or to precipitate further product. The precipitated product conveniently may be separated in conventional manner such as by filtration or decantation and thereafter purified by recrystallization from suitable organic solvents.

The (bicyclohexyl)-4-amine employed as a starting material in the present invention occurs in two isomeric forms known as the alpha and beta isomers. These two isomers may be prepared by known methods. In such methods, 4-cyclohexylcyclohexanol is dehydrogenated over a copper catalyst at 300° C. to form 4-cyclohexylcyclohexanone, and this product thereafter ammoniated to form a 4-cyclohexylcyclohexanone imine. The latter is thereafter hydrogenated over a nickel catalyst at 60° C. and 75 pounds pressure per square inch to give a reaction mixture containing about equal amounts of the alpha and beta isomers of (bicyclohexyl)-4-amine. The hydrogen chloride salt of the beta isomer of the amine is soluble in chloroform while the hydrogen chloride salt of the alpha isomer of the amine is substantially insoluble in chloroform. Thus, the isomeric amines may be separated in the form of their hydrogen chloride salts, and the salts thereafter converted to the free amine. The hydrogen chloride salts of the alpha and beta isomers of the amine melt at 295°–300° C. and 228°–232° C., respectively, while the alpha isomer of the amine melts at 58°–62° C. and the beta isomer of the amine melts at 32° C.

The following examples illustrate the invention but are not to be construed as limiting:

*Example 1.—2,2-dichloro-1-(4-cyclohexylcyclohexylamino)-1-ethanol α-isomer*

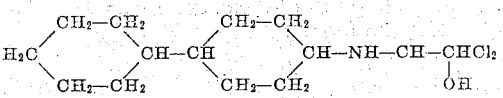

(Bicyclohexyl)-4-amine α-isomer (18.0 grams; 0.1 mole) dissolved in 300 milliliters of ether was slowly added portionwise over a period of about 15 minutes to 11.3 grams (0.1 mole) of dichloroacetaldehyde dissolved in 100 milliliters of ether. The addition was carried out with stirring and cooling and at a temperature of from 0° to 10° C. During the addition, a crystalline solid precipitated in the reaction mixture. Upon completion of the reaction, the solid which had formed was separated by filtration. As a result of these operations, there was obtained a 2,2-dichloro-1-(4-cyclohexylcyclohexylamino)-ethanol α-isomer product as a crystalline solid melting at 72°–73° C. This product had a chlorine content of 24.07 percent compared to the theoretical value of 24.10 percent.

*Example 2.—2,2,3 - trichloro-1-(4-cyclohexylcyclohexylamino)-1-propanol α-isomer*

(Bicyclohexyl)-4-amine α-isomer (18.0 grams; 0.1 mole) dissolved in 300 milliliters of methanol is slowly added portionwise with stirring over a period of about 15 minutes to 16.1 grams (0.1 mole) of 2,2,3-trichloropropionaldehyde dissolved in 100 milliliters of methanol. The addition is carried out with stirring and cooling and at a temperature of from 0° to 10° C. Upon completion of the reaction, the solid which precipitates is filtered to obtain a 2,2,3 - trichloro - 1 - (4 - cyclohexylcyclohexylamino)-1-propanol α-isomer product as a white crystalline solid. 2,2,3 - trichloro - 1 - (4-cyclohexylcyclohexylamino)-1-propanol α-isomer has a molecular weight of 342.5.

*Example 3.—2,2 - dichloro - 1 - (4-cyclohexylcyclohexylamino)-1-butanol α-isomer*

A solution of (bicyclohexyl)-4-amine α-isomer (36.0 grams; 0.2 mole) in 250 milliliters of ethanol is slowly added portionwise with stirring to a solution of 35.0 grams (0.2 mole) of 2,2-dichlorobutyraldehyde in 100 milliliters of ethanol. The addition is carried out as described in the previous example. The solid which forms in the reaction mixture is separated by filtration and dried to obtain a 2,2-dichloro-1-(4-cyclohexylcyclohexylamino)-1-butanol α-isomer product. 2,2-dichloro-1-(4-cyclohexylcyclohexylamino)-1-butanol α-isomer has a molecular weight of 356.5.

In a similar manner the β-isomers of 2,2,2-trichloro-1-(4-cyclohexylcyclohexylamino)-1-ethanol, 2,2-dichloro-1-(4-cyclohexylcyclohexylamino)-1-propanol, and 2,2-dichloro-1-(4-cyclohexylcyclohexylamino)-1-pentanol may be prepared by the reaction of (bicyclohexyl)-4-amine β-isomer with 2,2,2-trichloroacetaldehyde, 2,2-dichloropropionaldehyde and 2,2-dichlorovaleraldehyde, respectively.

The new compounds of the present invention have been tested and found to be effective as herbicides and parasiticides. For such use, the products may be dispersed on an inert finely divided solid and employed as dusts. Also, such mixtures may be dispersed in water with the aid of a wetting agent, and the resulting aqueous suspensions employed as sprays. In other procedures, the products may be employed as constituents of oil-in-water emulsions or water dispersions with or without the addition of wetting, dispersing or emulsifying agents. In representative operations, 100 percent controls of tomato early blight (*Alternaria solani*) on tomato plants have been obtained with the application of aqueous compositions containing 0.12 pound of 2,2-dichloro-1-(4-cyclohexylcyclohexylamino)ethanol α-isomer per 100 gallons of ultimate mixture to the foliage of the tomato plants.

I claim:

1. A polychloro - 1 - (4-cyclohexylcyclohexylamino)alkanol having the formula

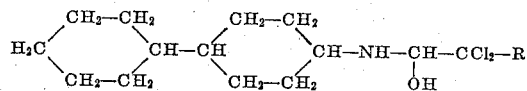

wherein R represents a member selected from the group consisting of hydrogen, chlorine, chloromethyl, methyl, ethyl and propyl.

2. 2,2-dichloro - 1-(4-cyclohexylcyclohexylamino)ethanol α-isomer.

3. A process for the preparation of a polychloro-1-(4-cyclohexylcyclohexylamino) alkanol having the formula

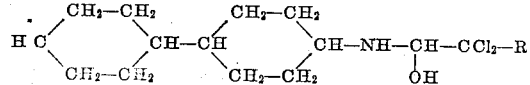

which comprises the step of reacting portionwise (bicyclohexyl)-4-amine with an equimolar amount of a polychloroaldehyde having the formula

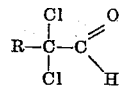

the symbol R in the above formulae representing a member selected from the group consisting of hydrogen, chlorine, chloromethyl, methyl, ethyl and propyl.

No references cited.